United States Patent
Saptharishi et al.

(10) Patent No.: US 10,732,788 B1
(45) Date of Patent: Aug. 4, 2020

(54) SYSTEM AND METHOD FOR DISPLAYING AND USING ATIS INFORMATION

(71) Applicant: HONEYWELL INTERNATIONAL INC., Morris Plains, NJ (US)

(72) Inventors: Hariharan Saptharishi, Tamilnadu (IN); Gobinathan Baladhandapani, TamilNadu (IN); Gang He, Morristown, NJ (US); Narayanan Srinivasan, TamilNadu (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/247,167

(22) Filed: Jan. 14, 2019

(51) Int. Cl.
| | |
|---|---|
| *G06F 3/048* | (2013.01) |
| *G06F 3/0481* | (2013.01) |
| *G10L 15/22* | (2006.01) |
| *G08G 5/00* | (2006.01) |
| *G10L 15/18* | (2013.01) |
| *G06F 3/0482* | (2013.01) |
| *G06F 40/205* | (2020.01) |

(52) U.S. Cl.
CPC ........ *G06F 3/04817* (2013.01); *G06F 3/0482* (2013.01); *G06F 40/205* (2020.01); *G08G 5/0013* (2013.01); *G10L 15/1822* (2013.01); *G10L 15/22* (2013.01)

(58) Field of Classification Search
CPC .... G08G 5/0013; G08G 5/025; G08G 5/0039; G08G 5/0078; G08G 5/065; G08G 5/00; G08G 5/0017; G08G 5/0021; H04B 7/18506; G06F 3/04817
See application file for complete search history.

(56) References Cited

U.S. PATENT DOCUMENTS

| | | | |
|---|---|---|---|
| 2009/0089693 A1* | 4/2009 | Fahy | G06F 17/243 715/764 |
| 2012/0075124 A1 | 3/2012 | Whitlow et al. | |
| 2012/0274484 A1* | 11/2012 | Zimmer | G08G 5/0091 340/945 |

(Continued)

FOREIGN PATENT DOCUMENTS

FR    3009759 A1    2/2015

*Primary Examiner* — Alex Olshannikov
(74) *Attorney, Agent, or Firm* — Lorenz & Kopf, LLP (57) ABSTRACT

A system for presenting broadcasted aeronautical information in an aircraft is provided. The system is configured to: capture a broadcasted aeronautical information message; parse the broadcasted message into a plurality of message components; extract a plurality of message features from the plurality of message components; categorize each message feature based on a flight phase to which the message feature pertains; group each categorized message feature into a predetermined one of a plurality of avionic subcategories; associate each subcategorized message feature with one of a plurality of context-based graphical elements, wherein each context-based graphical element is configured to display textual information descriptive of the message feature and/or graphical information descriptive of the message feature; and cause the display of descriptive information regarding a first category of the subcategorized message features via their associated context-based graphical element in a graphical user interface (GUI) display.

20 Claims, 9 Drawing Sheets

(56) References Cited

U.S. PATENT DOCUMENTS

| | | | |
|---|---|---|---|
| 2013/0027226 A1* | 1/2013 | Cabos | G08G 5/0013 340/961 |
| 2015/0162001 A1* | 6/2015 | Kar | G08G 5/0013 704/235 |
| 2016/0217693 A1 | 7/2016 | Samuthirapandian et al. | |
| 2018/0005536 A1 | 1/2018 | Jacquier et al. | |

* cited by examiner

SYSTEM AND METHOD FOR DISPLAYING AND USING ATIS INFORMATION

TECHNICAL FIELD

The technology described in this patent document relates generally to presentation systems in an aircraft and more particularly to systems and methods of presenting broadcast information messages to flight crew in an aircraft.

BACKGROUND

Automatic terminal information service (ATIS), provides a continuous broadcast of recorded aeronautical information in busier terminal areas, e.g. airports and their immediate surroundings. ATIS broadcasts can be in a pre-recorded voice or digital format and contain essential information, such as current weather information, active runways, available approaches, and other information required by the flight crew. The flight crew may listen to an available ATIS broadcast before contacting the local air traffic control (ATC) unit, which can reduce the controllers' workload and relieves frequency congestion. The currently available systems for accessing ATIS information, however, do not make it easy for the flight crew to pull out specific information that may be important to the pilot without having to listen to or read the ATIS message in its entirety.

Accordingly, it is desirable to provide a user interface that will allow flight crew to quickly obtain desired information from an ATIS message. Furthermore, other desirable features and characteristics of the present invention will become apparent from the subsequent detailed description of the invention and the appended claims, taken in conjunction with the accompanying drawings and the background of the invention.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A processor-implemented method for presenting broadcasted aeronautical information in an aircraft is provided. The method includes: capturing a broadcasted aeronautical information message; parsing the broadcasted message into a plurality of message components; extracting a plurality of message features from the plurality of message components; categorizing each message feature based on a flight phase to which the message feature pertains; grouping each categorized message feature into a predetermined one of a plurality of avionic subcategories; associating each subcategorized message feature with one of a plurality of context-based graphical elements, wherein each context-based graphical element is configured to display textual information descriptive of the message feature and/or graphical information descriptive of the message feature; and causing the display of descriptive information regarding a first category of the subcategorized message features via their associated context-based graphical element in a graphical user interface (GUI) display.

A system for presenting broadcasted aeronautical information in an aircraft is provided. The system includes one or more processors configured by programming instructions on non-transient computer readable media. The system is configured to: capture a broadcasted aeronautical information message; parse the broadcasted message into a plurality of message components; extract a plurality of message features from the plurality of message components; categorize each message feature based on a flight phase to which the message feature pertains; group each categorized message feature into a predetermined one of a plurality of avionic subcategories; associate each subcategorized message feature with one of a plurality of context-based graphical elements, wherein each context-based graphical element is configured to display textual information descriptive of the message feature and/or graphical information descriptive of the message feature; and cause the display of descriptive information regarding a first category of the subcategorized message features via their associated context-based graphical element in a graphical user interface (GUI) display.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Aspects of the present disclosure are best understood from the following detailed description when read with the accompanying figures, wherein like numerals denote like elements, and wherein.

DETAILED DESCRIPTION

The subject matter described herein discloses apparatus, systems, techniques and articles for organizing and providing a graphical presentation of broadcasted aeronautical information in an aircraft. The following detailed description is merely exemplary in nature and is not intended to limit the invention or the application and uses of the invention. As used herein, the word "exemplary" means "serving as an example, instance, or illustration." Thus, any embodiment described herein as "exemplary" or "example" is not necessarily to be construed as preferred or advantageous over other embodiments. All embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, summary, or the following detailed description.

Figure 1:
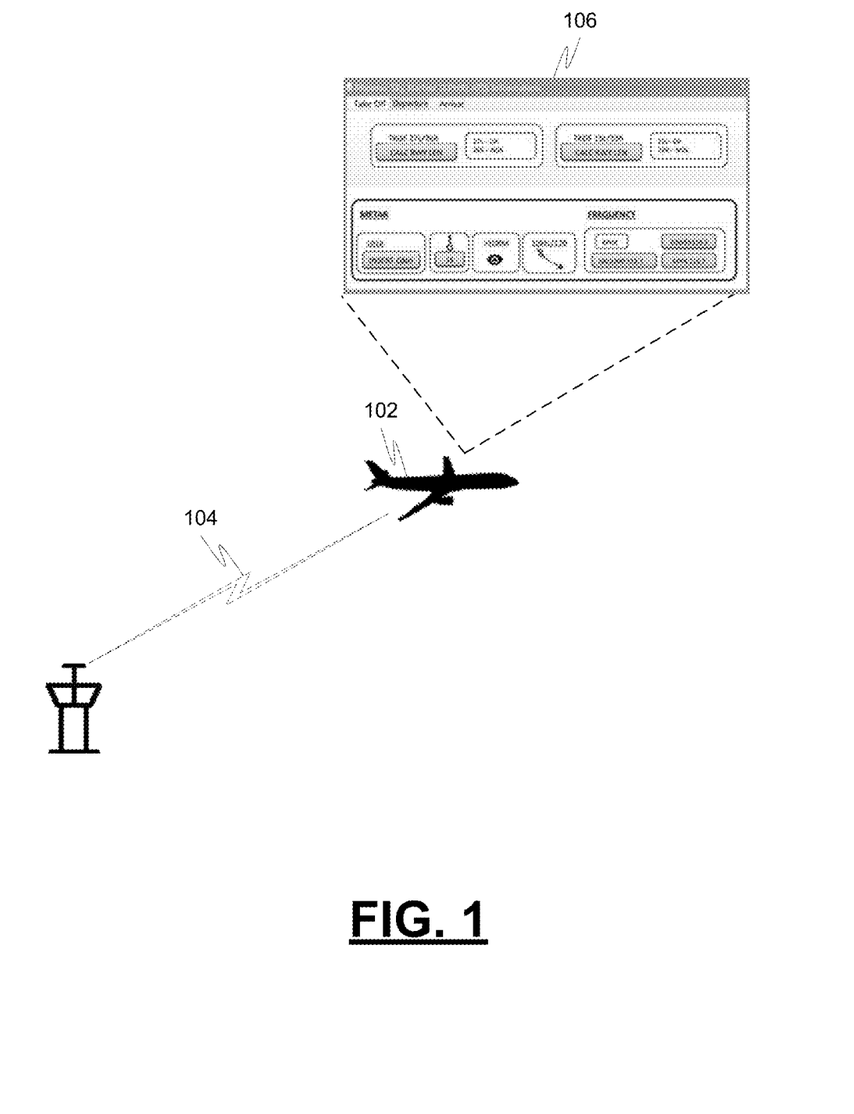
FIG. 1 is a diagram illustrating an example operating scenario in an aircraft, in accordance with some embodiments.

FIG. 1 is a diagram illustrating an example operating scenario in an aircraft. As an aircraft 102 approaches a destination airport, the aircraft 102 may receive a broadcast 104 of recorded aeronautical information (e.g., automatic terminal information service (ATIS) information). ATIS broadcasts 104 contain essential information, such as current weather information, active runways, available approaches, and other information required by the flight crew, such as important NOTAMs. A Notice to Airmen (NOTAM) is a notice filed with an aviation authority to alert aircraft pilots of potential hazards along a flight route or at a location that could affect the safety of the flight. The example aircraft 102 includes a system for organizing and providing a graphical presentation 106 of the broadcasted aeronautical information. The system will monitor for ATIS information and provide a quick preview of the ATIS information to the flight crew in a well-organized and grouped manner. This quick preview of ATIS information can aid the flight crew by providing necessary information in an intuitive way. The information is organized in a manner that can allow the flight crew to only focus on the phase of the flight for which the information is needed. The information can be depicted in a graphical manner that reduces the amount of time for the flight crew to process the information content and to reduce cluttering.

Figure 2:
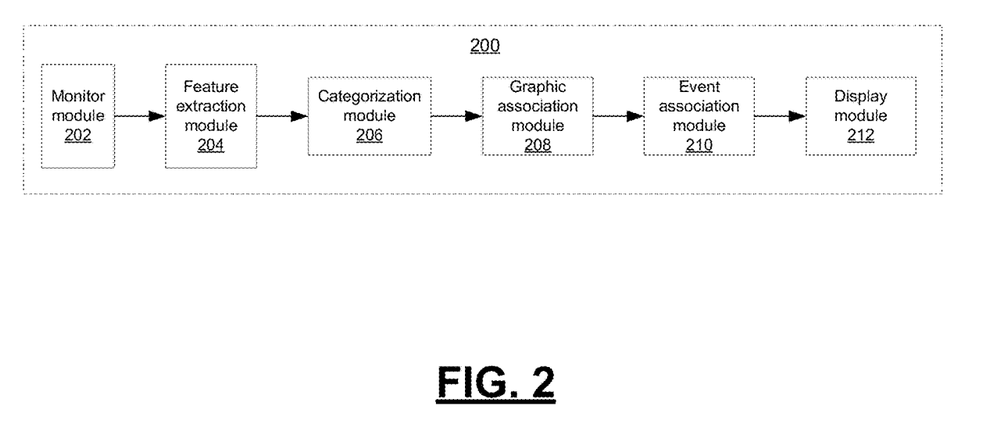
FIG. 2 is a block diagram illustrating an example system for organizing and providing a graphical presentation of broadcasted aeronautical information in an aircraft, in accordance with some embodiments.

FIG. 2 is a block diagram illustrating an example system 200 for organizing and providing a graphical presentation of broadcasted aeronautical information in an aircraft. In this example, the broadcasted aeronautical information is ATIS information, but the system is not limited to use with ATIS information. The example system 200 is configured to automatically parse an ATIS message (digital or voice) into different parts of a system command language, intuitively convert the parts into graphical representations, and display the graphical representations in a grouped manner in a display system, such as an integrated navigational (INAV) display, multifunction display (MFD) or others. The graphical representations organize the ATIS information in a manner that allows the flight crew to quickly obtained pertinent information from the ATIS message without reading or listening to the complete ATIS message to obtain the small snippet from the message of which the flight crew is interested. The example system 200 is also configured to provide an option for flight crew selection of an ATIS element and automatic performance of a context based action upon selection of the ATIS element. The context based action may include the updating of flight deck equipment with the value contained in the ATIS element. Additionally, the example system 200 is configured to save prior iterations of ATIS messages that contain different content.

The example system 200 includes a monitor module 202, a feature extraction module 204, a categorization module 206, a graphic association module 208, an event association module 210, a display module 212, and a controller (not shown) that is configured to implement the monitor module 202, feature extraction module 204, categorization module 206, graphic association module 208, event association module 210, and display module 212. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example monitor module 202 is configured to monitor for and capture a broadcasted aeronautical information message. The broadcasted aeronautical information message may be in the form of a broadcasted voice message or a broadcasted digital message and, in this example, is an automatic terminal information service (ATIS) message.

The example feature extraction module 204 is configured to parse the broadcasted message into a plurality of message components and extract a plurality of message features from the plurality of message components. When the broadcasted message is a voice message, the example feature extraction module 204 is configured to convert the broadcasted message to a converted digital message, for example using voice transcription. The example feature extraction module 204 is configured to parse the converted digital message into a plurality of message components when a broadcasted voice message is captured and to parse a broadcasted digital message into a plurality of message components when a broadcasted digital message is captured.

The categorization module 206 is configured to categorize each message feature based on a flight phase to which the message feature pertains and group each categorized message feature into a predetermined one of a plurality of avionic subcategories. The plurality of subcategories includes at least some of weather information, runway information, taxi information, navigation information, approach information, and radio frequency information.

The example graphic association module 208 is configured to associate each subcategorized message feature with one of a plurality of context-based graphical elements, wherein each context-based graphical element is configured to display textual information descriptive of the message feature and/or graphical information descriptive of the message feature. A first subset of the plurality of context-based graphical elements is actuatable to request that an event related to the subcategorized message feature be performed, and a second subset of the plurality of context-based graphical elements is configured to request event performance results to be displayed.

The example event association module 210 is configured to receive an event performance request via the actuation of a context-based graphical element from the first subset of context-based graphical elements and cause the performance of an event responsive to the event performance request. As an example, the event could be the insertion of a value from the ATIS message into appropriate flight deck equipment, the determination of whether a recommended runway is appropriate for the aircraft, or others.

The example display module 212 is configured to cause the display of descriptive information regarding a first category of the subcategorized message features via their associated context-based graphical element in a graphical user interface (GUI) display. The example display module 212 is also configured to cause event performance results to be displayed via the GUI.

Figure 3:
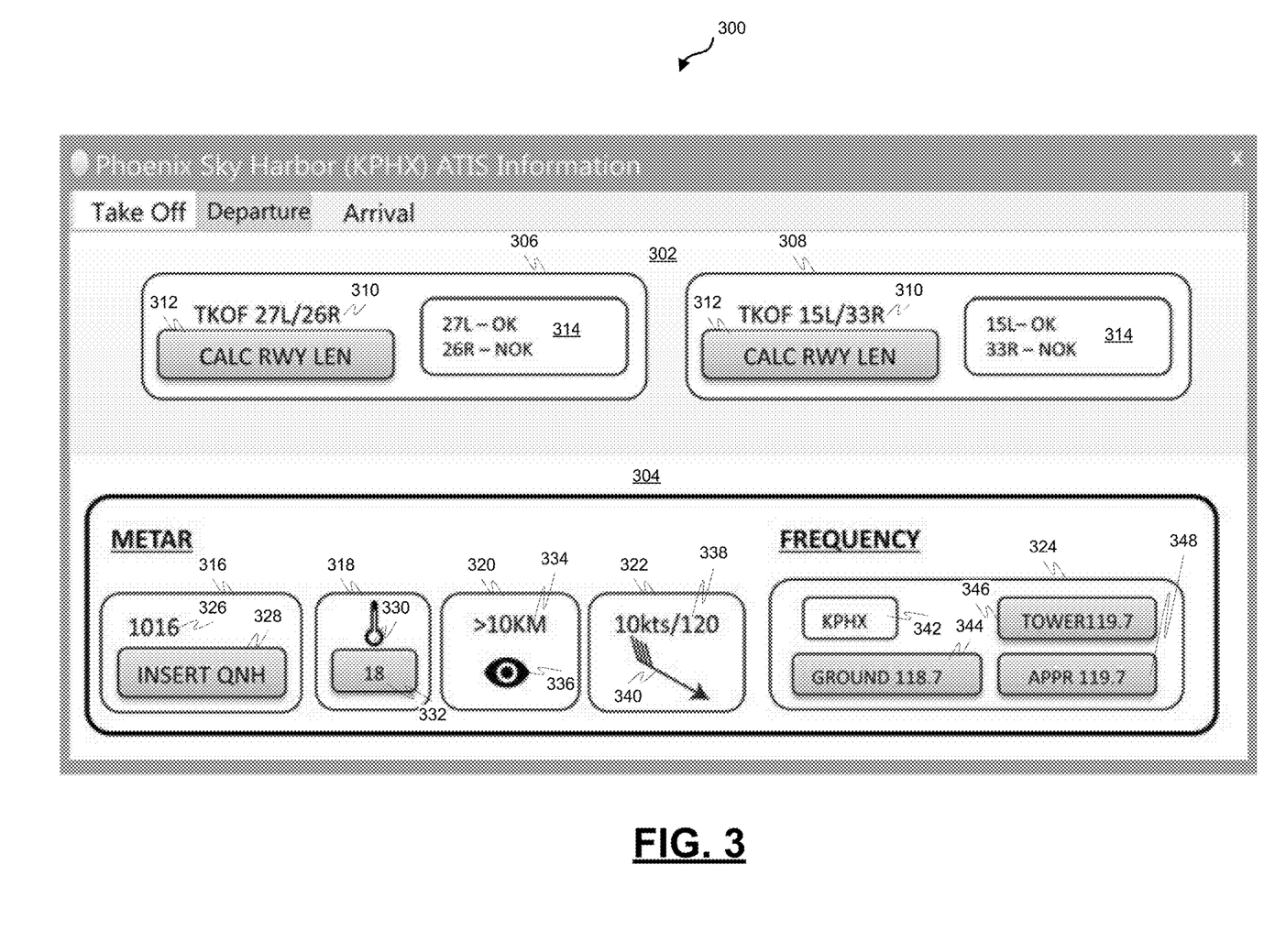
FIG. 3 is a diagram depicting an example GUI that provides a graphical depiction of ATIS data, in accordance with some embodiments.

FIG. 3 is a diagram depicting an example GUI 300 that provides a graphical depiction of ATIS data. The example GUI 300 provides an example window that displays departure information from an ATIS message. The example GUI window 300 includes a top window pane 302 and a bottom window pane 304. The top window pane 302 displays a first takeoff runway section 306 and a second takeoff runway section 308. Each takeoff runway section 306, 308 includes a first context-based graphical element 310 that provides a textual display of takeoff runway options from the ATIS message, a second context-based graphical element 312 in the form of a button that when selected requests the performance of an event (calculation of runway length, in this example), and a third context-based graphical element 314 that displays the result of the event performance (whether the runway length for the takeoff runway options identified by the first context-based graphical element 310 is suitable for the aircraft, in this example).

The bottom window pane 304 displays five different window sections 316, 318, 320, 322, 324. The first four window sections 316, 318, 320, 322 relate to METAR data from the ATIS message and the fifth window section 324 relates to frequency data from the ATIS message. The first window section 316 includes a context-based graphical element 326 that provides a textual indication of QNH (barometric pressure adjusted to sea level) retrieved from the ATIS message and a context-based graphical element 328 in the form of a button that when selected requests the performance of an event (the insertion of the QNH into the appropriate flight deck equipment, in this example). The second window section 318 includes a context-based graphical element 330 that provides a graphical indication of temperature and a context-based graphical element 332 in the form of a button that identifies the temperature value retrieved from the ATIS message and that when selected requests the performance of an event (the insertion of the temperature into the appropriate flight deck equipment, in this example). The third window section 320 includes a context-based graphical element 334 that provides a textual indication of the visibility value retrieved from the ATIS message and a context-based graphical element 336 that indicates that the textual value identified by context-based graphical element 334 relates to visibility. The fourth window section 322 includes a context-based graphical element 338 that provides a textual indication of wind speed and direction retrieved from the ATIS message and a context-based graphical element 340 that indicates that the textual value identified by context-based graphical element 338 relates to wind speed and direction.

The fifth window section 324 relates to frequency data from the ATIS message. The fifth window section 324 includes a context-based graphical element 342 that provides a textual indication of the airport (KPHX or Phoenix Sky Harbor airport in this example) retrieved from the ATIS message, a context-based graphical element 344 in the form of a button that indicates the radio frequency for the ground and that when selected requests the performance of an event (the insertion of the ground frequency into the appropriate flight deck equipment, in this example), a context-based graphical element 346 in the form of a button that indicates the radio frequency for the tower and that when selected requests the performance of an event (the insertion of the tower frequency into the appropriate flight deck equipment, in this example), a context-based graphical element 348 in the form of a button that indicates the radio frequency for approach and that when selected requests the performance of an event (the insertion of the approach frequency into the appropriate flight deck equipment, in this example).

Figure 4:
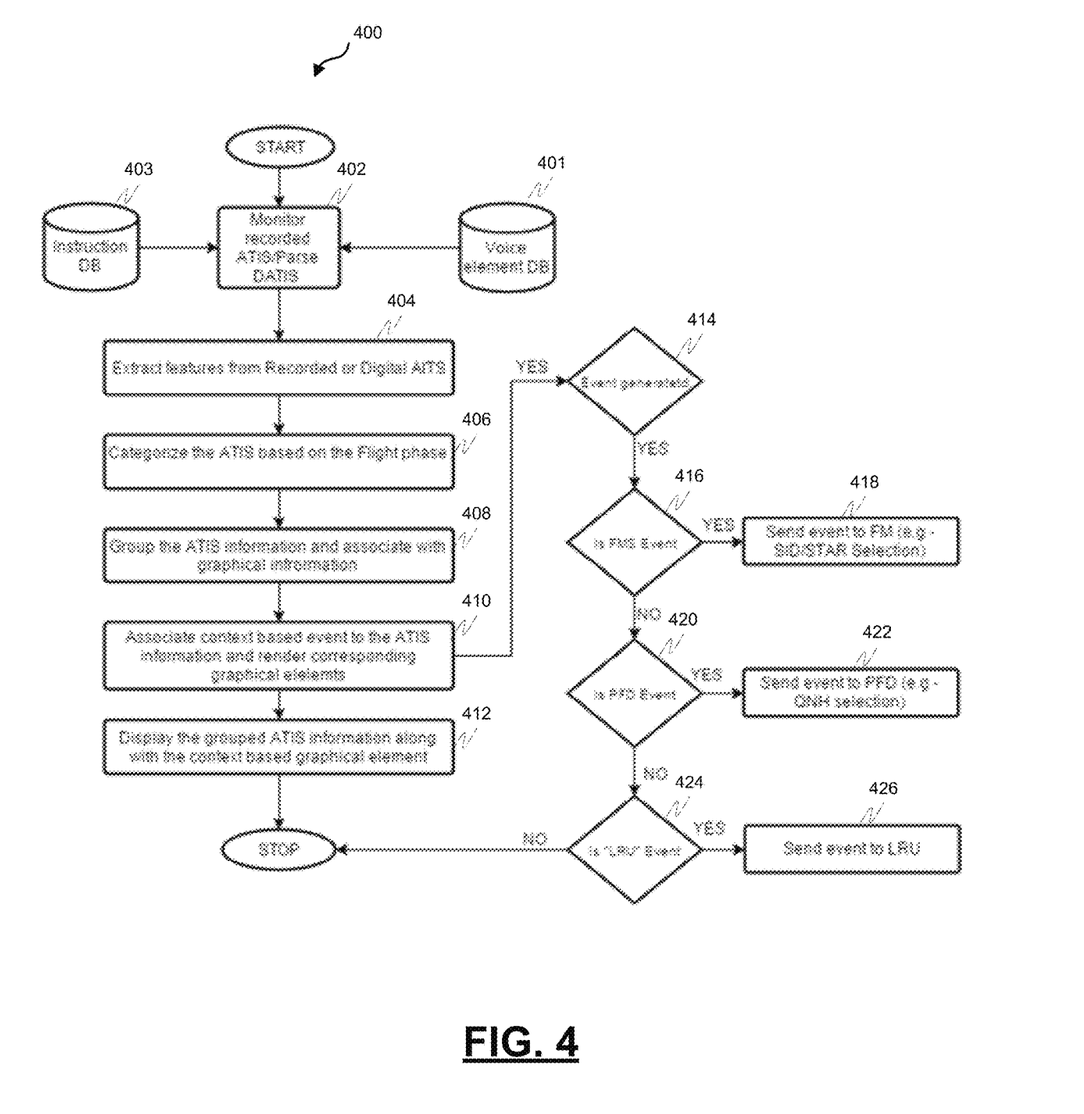
FIG. 4 is a process flow chart depicting an example process in an example system for organizing and providing a graphical presentation of broadcasted aeronautical information in an aircraft, in accordance with some embodiments.

FIG. 4 is a process flow chart depicting an example process in an example system for organizing and providing a graphical presentation of broadcasted aeronautical information in an aircraft. The broadcasted aeronautical information comes in the form of an ATIS message in this example, but the example process is not limited to use with ATIS messages and could be used for other messages that comprise broadcasted aeronautical information.

The example process 400 includes monitoring for a recorded ATIS message (digital or voice), and parsing the message (operation 402) into a plurality of message components. To parse the ATIS message, voice elements from a voice element database 401 could be used for parsing a voice message and/or converting the voice message to a converted digital message and instructions from an instruction database 403 could be used for parsing a digital or converted to digital message.

The example process 400 includes extracting message features from the voice or digital ATIS message (operation 404) and categorizing the message features from the ATIS message based on the flight phase (operation 406). The extracting involves extracting a plurality of message features from the plurality of message components.

The example process 400 includes grouping each categorized message feature and associating the message feature with graphical information (operation 408). The grouping of each categorized message feature involves grouping each categorized message feature into a predetermined one of a plurality of avionic subcategories. The plurality of subcategories may include at least some of weather information, runway information, taxi information, navigation information, approach information, and radio frequency information.

The example process 400 includes associating a context based event to the ATIS information and rendering corresponding graphical elements (operation 410) and displaying the grouped ATIS information along with the context based graphical element (operation 412). The associating may involve associating each subcategorized message feature with one of a plurality of context-based graphical elements, wherein each context-based graphical element is configured to display textual information descriptive of the message feature and/or graphical information descriptive of the message feature. A first subset of the plurality of context-based graphical elements is actuatable to request that an event related to the subcategorized message feature be performed, and a second subset of the plurality of context-based graphical elements is configured to request event performance results to be displayed.

The example process 400 includes determining if an event performance request was generated (decision 414) as a result of actuation of a context-based graphical element. When an event performance request is generated (yes at decision 414), a determination is made regarding whether the event performance request relates to a flight management system (FMS) event (decision 416). When the event performance request relates to an FMS event (yes at decision 416), the information related to the event performance request is sent to the FMS (operation 418). SID/STAR selection is an example of an event performance request sent to the FMS.

When the event performance request does not relate to an FMS event (no at decision 416), a determination is made regarding whether the event performance request relates to a primary flight display (PFD) event (decision 420). When the event performance request relates to a PFD event (yes at decision 420), the information related to the event performance request is sent to the PFD (operation 422). QNH selection is an example of an event performance request sent to the PFD.

When the event performance request does not relate to a PFD event (no at decision 420), a determination is made regarding whether the event performance request relates to a line replaceable unit (LRU) event (decision 424). When the event performance request relates to an LRU event (yes at decision 424), the information related to the event performance request is sent to the LRU (operation 426). When the event performance request does not relate to an LRU event (no at decision 424), the process ends for that iteration.

Figure 5:
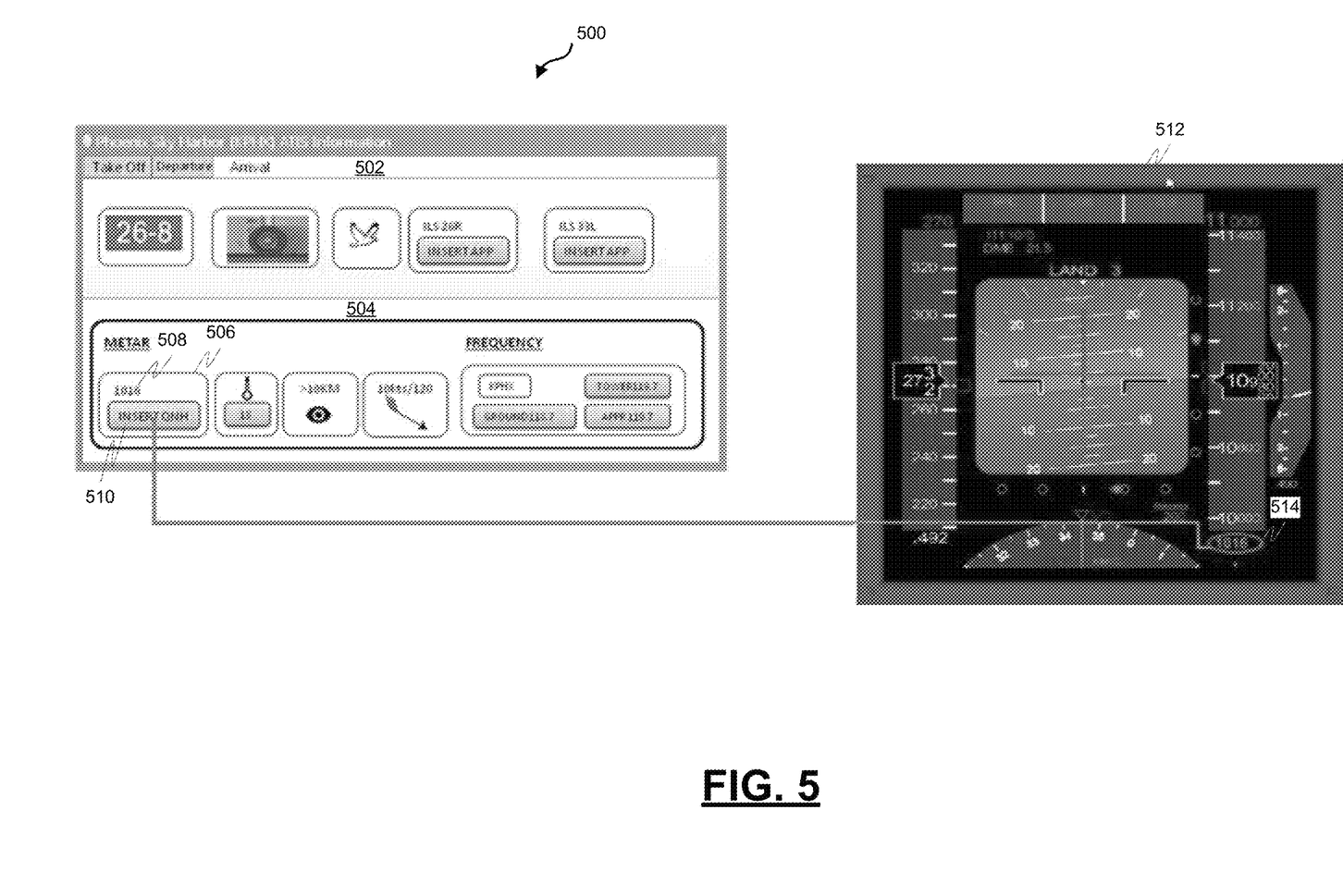
FIG. 5 is a diagram depicting an example scenario in which an example GUI that provides a graphical depiction of ATIS data can be used to cause the performance of an event, in accordance with some embodiments.

FIG. 5 is a diagram depicting an example scenario in which an example GUI 500 that provides a graphical depiction of ATIS data can be used to cause the performance of an event—the selection of QNH. In this example scenario, the flight crew is about to cross a transition level and wants to know the QNH of the destination airport. If the flight crew were to attempt to access a raw ATIS message, the flight crew may have to tune to the ATIS message, listen to a voice ATIS message, and wait until the QNH data is received and announced. If the flight crew has access to Digital ATIS, the flight crew would have to access the D-ATIS page and go through all the ATIS data and note down QNH. In either case, retrieving the QNH data can be a time consuming process. The example GUI 500 provides the flight crew with the QNH in a more intuitive way.

On the arrival window 502, the flight crew can view the bottom window pane 504. A first window section 506 in the bottom window pane 504 includes the QNH value for the destination airport in a context-based graphical element 508 that provides a textual indication of QNH retrieved from an ATIS message and a context-based graphical element 510 in the form of a button that when selected requests the performance of an event—the insertion of the QNH into a PFD 512 at the appropriate location 514.

Figure 6:
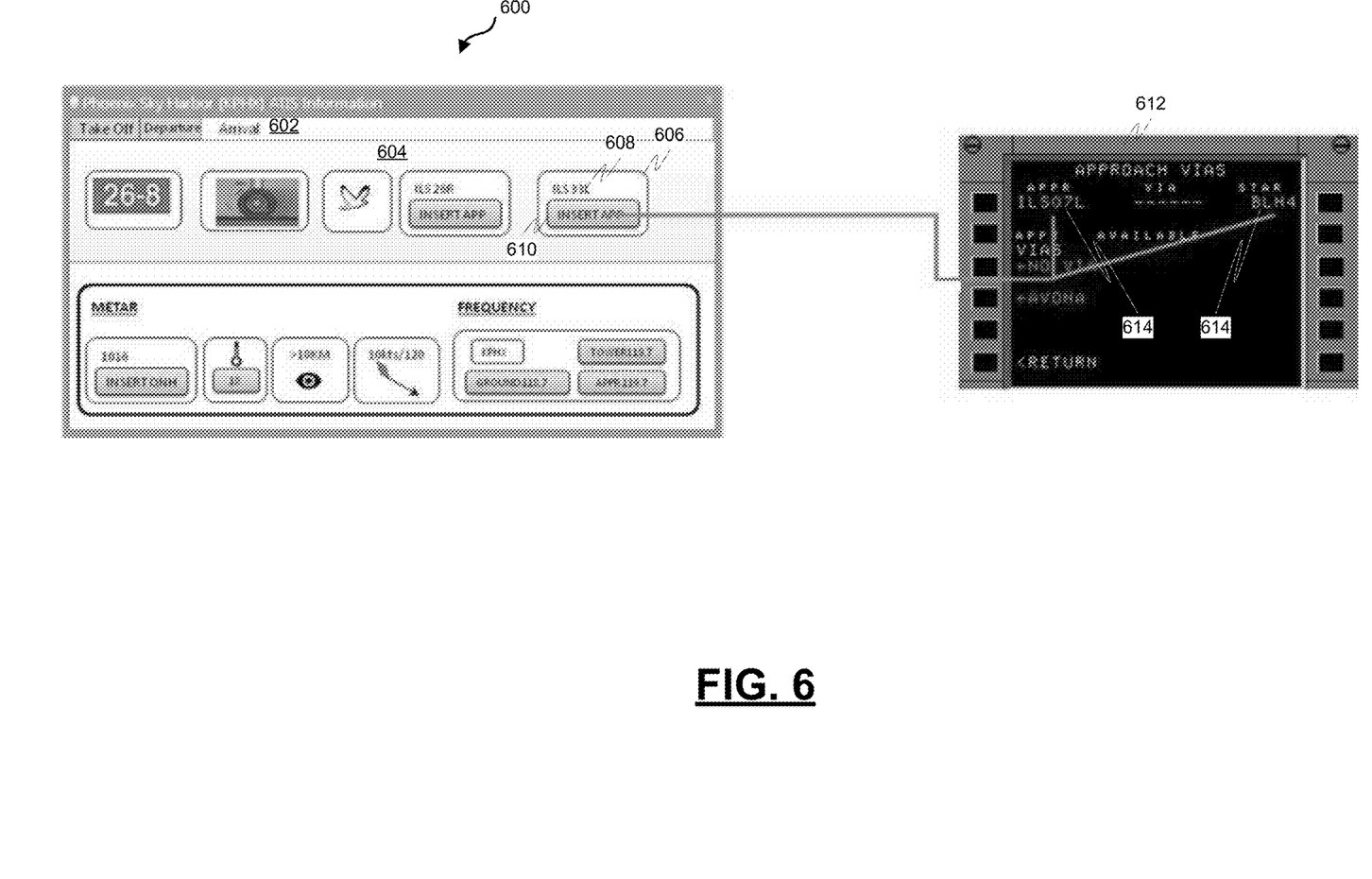
FIG. 6 is a diagram depicting another example scenario in which an example GUI that provides a graphical depiction of ATIS data can be used to cause the performance of an event, in accordance with some embodiments.

FIG. 6 is a diagram depicting an example scenario in which an example GUI 600 that provides a graphical depiction of ATIS data can be used to cause the performance of an event—Approach/STAR Selection. In this example scenario, the flight crew can easily select an approach/star that has been approved by ATC and that is decoded from the ATIS.

On the arrival window 602, the flight crew can view the top window pane 604. A fifth window section 606 in the top window pane 604 includes the approach type and star in a context-based graphical element 608 that provides a textual indication of approach type and star retrieved from an ATIS message and a context-based graphical element 610 in the form of a button that when selected requests the performance of an event—the insertion of the approach type and star into a FMS (not shown) for display via a display 612 at the appropriate locations 614.

Figure 7:
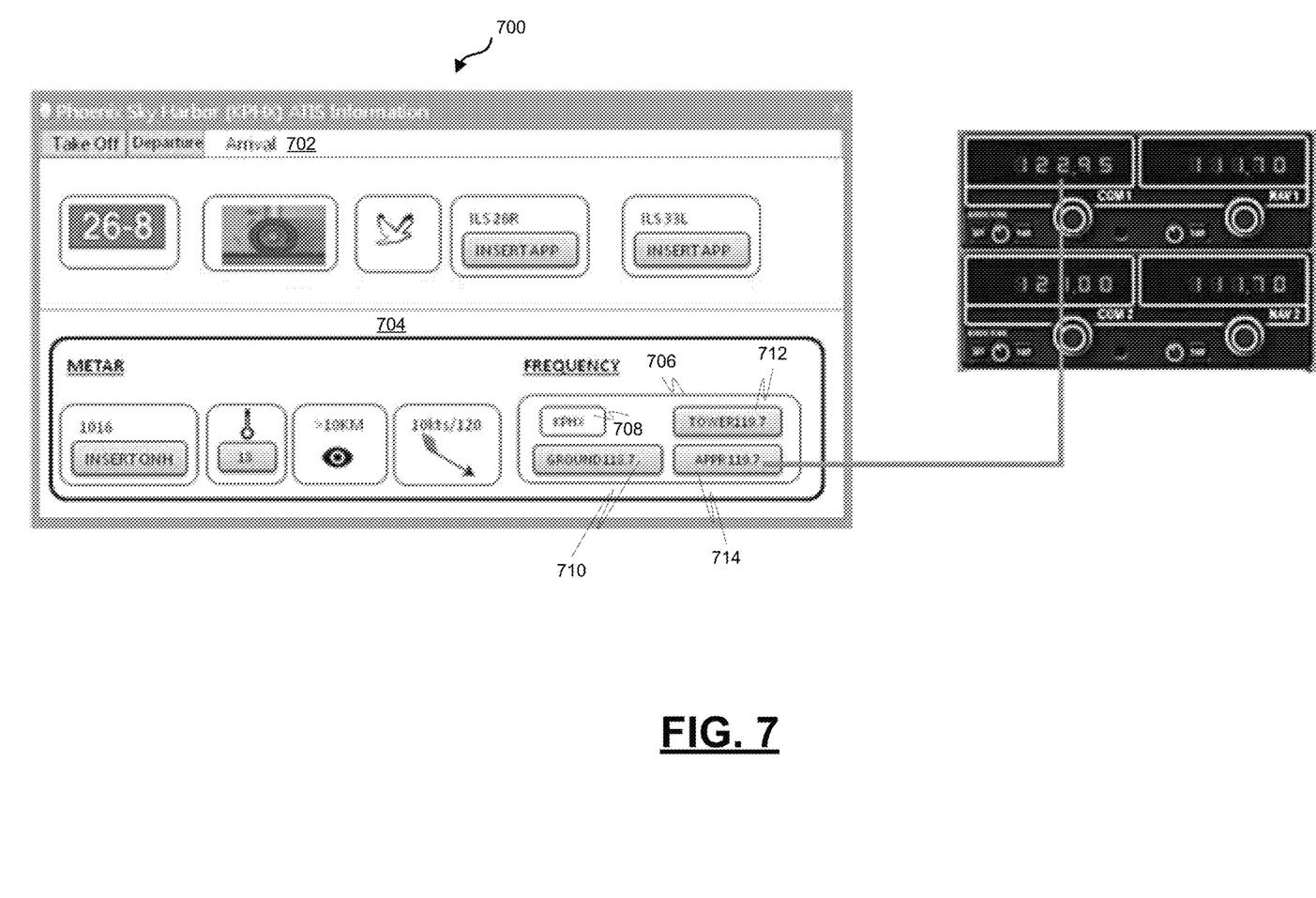
FIG. 7 is a diagram depicting another example scenario in which an example GUI that provides a graphical depiction of ATIS data can be used to cause the performance of an event, in accordance with some embodiments.

FIG. 7 is a diagram depicting an example scenario in which an example GUI 700 that provides a graphical depiction of ATIS data can be used to cause the performance of an event—Setting Frequency in RMP. In this example scenario, the flight crew can easily select all frequencies identified in the ATIS message.

On the arrival window 702, the flight crew can view the bottom window pane 704. A fifth window section 706 in the bottom window pane 704 includes the frequency values for the Phoenix airport. The fifth window section 706 includes a context-based graphical element 708 that provides a textual indication of the airport (KPHX or Phoenix Sky Harbor airport in this example) retrieved from the ATIS message, a context-based graphical element 710 in the form of a button that indicates the radio frequency for the ground and that when selected requests the performance of an event (the insertion of the ground frequency into the appropriate flight deck equipment), a context-based graphical element 712 in the form of a button that indicates the radio frequency for the tower and that when selected requests the performance of an event (the insertion of the tower frequency into the appropriate flight deck equipment), and a context-based graphical element 714 in the form of a button that indicates the radio frequency for approach and that when selected requests the performance of an event (the insertion of the approach frequency into the appropriate flight deck equipment).

Figure 8:
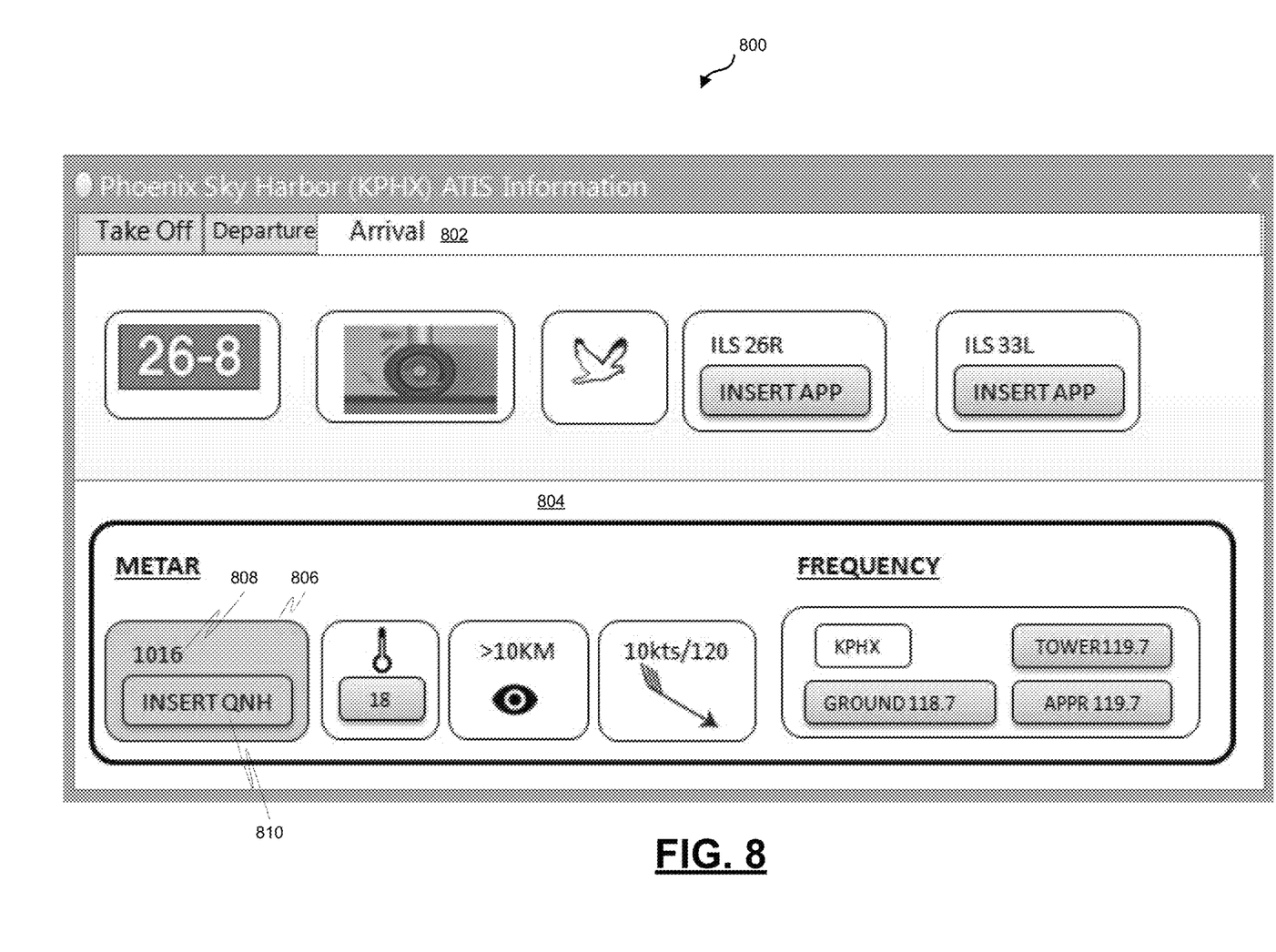
FIG. 8 is a diagram depicting an example scenario in which an example GUI provides a graphical depiction that an updated QNH has been received in the ATIS data, in accordance with some embodiments.

FIG. 8 is a diagram depicting an example scenario in which an example GUI 800 that provides a graphical depiction that an updated QNH has been received in the ATIS data. In this example, the flight crew may view the ATIS while descending from 30,000 feet and an assumption is that the transition level of airport is 7,000 feet. When the aircraft reaches 15,000 feet after about 10 minutes, the QNH of the airport may have changed. The flight crew will likely not know that the change occurred without the systems and methods described herein. Although the flight crew may receive QNH information while contacting the ATC tower, the flight crew may miss this data. The GUI 800, however, will provide the flight crew with the changed QNH information in a more intuitive way. In this example, the QNH information is highlighted (e.g., in a yellow color) to indicate a change in QNH to make it more likely that the flight crew will know that a change occurred.

On the arrival window 802, the flight crew can view the bottom window pane 804. A first window section 806 in the bottom window pane 804 includes the QNH value for the destination airport in a context-based graphical element 808 that provides a textual indication of QNH retrieved from an ATIS message and a context-based graphical element 810 in the form of a button that when selected requests the performance of an event—the insertion of the QNH into appropriate aircraft equipment. In this example, the entire first window section 806 is highlighted in a yellow color to indicate a change in QNH.

Figure 9:
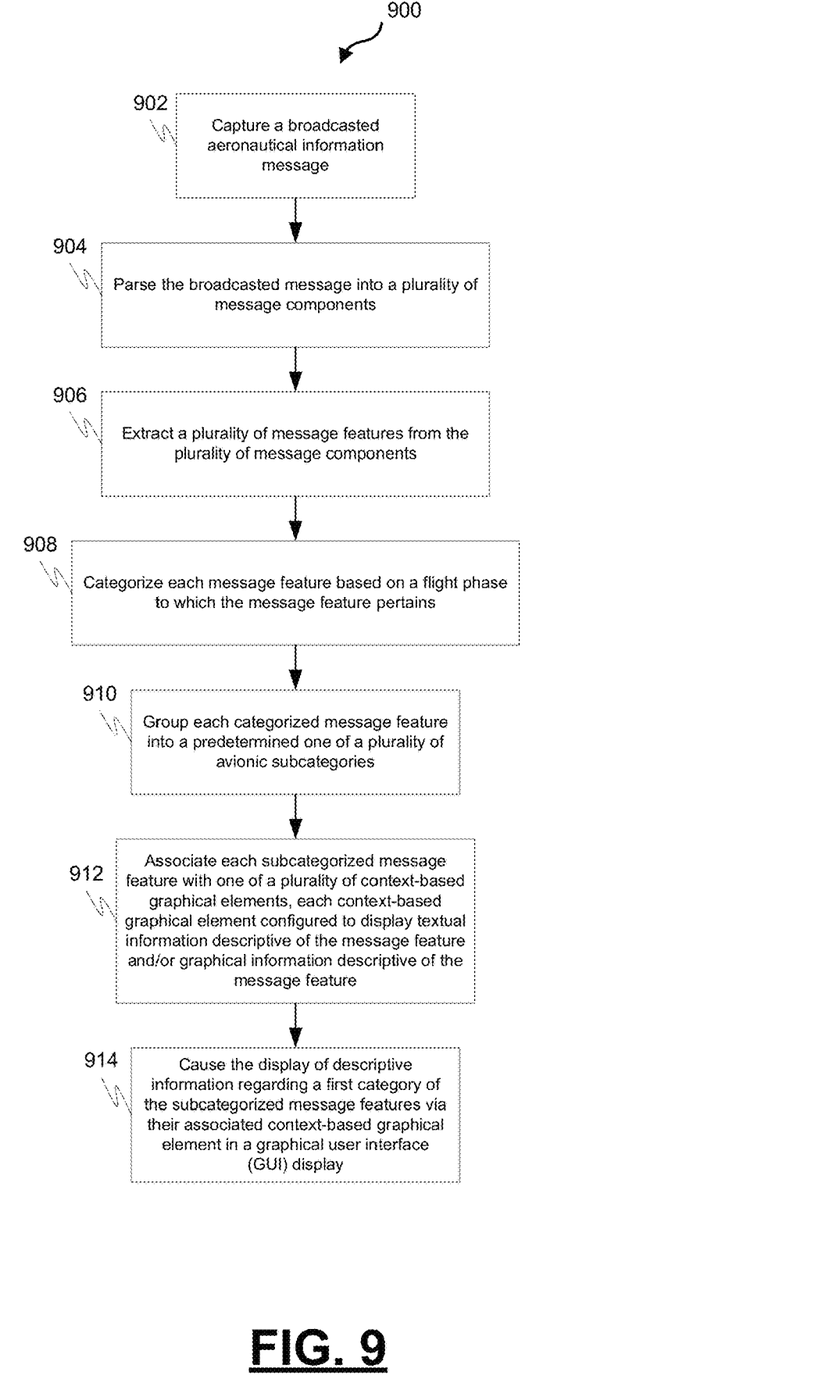
FIG. 9 is a process flow chart depicting an example process for presenting broadcasted aeronautical information in an aircraft, in accordance with some embodiments.

FIG. 9 is a process flow chart depicting an example process 900 for presenting broadcasted aeronautical information in an aircraft. The order of operation within the process is not limited to the sequential execution as illustrated in the figure, but may be performed in one or more varying orders as applicable and in accordance with the present disclosure.

The example process 900 includes capturing a broadcasted aeronautical information message (operation 902). The broadcasted aeronautical information message may include a broadcasted voice message or a broadcasted digital message. The broadcasted aeronautical information message may also include an automatic terminal information service (ATIS) message.

The example process 900 includes parsing the broadcasted message into a plurality of message components (operation 904). This may involve converting the broadcasted message to a converted digital message when the broadcasted message includes a broadcasted voice message. Parsing the broadcasted message may include parsing a converted digital message into a plurality of message components when a broadcasted voice message is captured. Parsing the broadcasted message may include parsing a broadcasted digital message into a plurality of message components when a broadcasted digital message is captured.

The example process 900 includes extracting a plurality of message features from the plurality of message components (operation 906) and categorizing each message feature based on a flight phase to which the message feature pertains (operation 908). The example process 900 includes grouping each categorized message feature into a predetermined one of a plurality of avionic subcategories (operation 910). The plurality of subcategories may include at least some of weather information, runway information, taxi information, navigation information, approach information, and radio frequency information.

The example process 900 includes associating each subcategorized message feature with one of a plurality of context-based graphical elements, wherein each context-based graphical element is configured to display textual information descriptive of the message feature and/or graphical information descriptive of the message feature (operation 912). A first subset of the plurality of context-based graphical elements may be actuatable to cause an event related to the subcategorized message feature to be performed, and a second subset of the plurality of context-based graphical elements may be configured to display event performance results.

The example process 900 includes causing the display of descriptive information regarding a first category of the subcategorized message features via their associated context-based graphical element in a graphical user interface (GUI) display (operation 914). The method may further include receiving an event performance request via the actuation of a context-based graphical element from the first subset of context-based graphical elements and causing the performance of an event responsive to the event performance request. The method may further include displaying results from the performance of the event via a context-based graphical element from the second subset of context-based graphical elements when the performed event calls for the display of results via the GUI.

Described herein are apparatus, systems, techniques and articles for organizing and providing a graphical presentation of broadcasted aeronautical information in an aircraft. The apparatus, systems, techniques and articles described herein may automatically parse an ATIS message (digital or voice, or some other non-ATIS message) into different parts of a system command language, intuitively convert the parts into graphical representations, and display the graphical representations in a grouped manner in a display system, such as an integrated navigational (INAV) display, multi-function display (MFD) or others. The graphical representations may organize the ATIS information in a manner that allows the flight crew to quickly obtained pertinent information from the ATIS message without reading or listening to the complete ATIS message to obtain the small snippet from the message of which the flight crew ima be interested. The apparatus, systems, techniques and articles described herein may provide an option for flight crew selection of an ATIS element and automatic performance of a context based action upon selection of the ATIS element. The context based action may include the updating of flight deck equipment with the value contained in the ATIS element. Additionally, the apparatus, systems, techniques and articles described herein may save prior iterations of ATIS messages that contain different content.

In one embodiment, a processor-implemented method for presenting broadcasted aeronautical information in an aircraft is provided. The method comprises: capturing a broadcasted aeronautical information message; parsing the broadcasted message into a plurality of message components; extracting a plurality of message features from the plurality of message components; categorizing each message feature based on a flight phase to which the message feature pertains; grouping each categorized message feature into a predetermined one of a plurality of avionic subcategories; associating each subcategorized message feature with one of a plurality of context-based graphical elements, wherein each context-based graphical element is configured to display textual information descriptive of the message feature and/or graphical information descriptive of the message feature; and causing the display of descriptive information regarding a first category of the subcategorized message features via their associated context-based graphical element in a graphical user interface (GUI) display.

These aspects and other embodiments may include one or more of the following features. The broadcasted aeronautical information message may comprise a broadcasted voice message or a broadcasted digital message. The broadcasted aeronautical information message may comprise an automatic terminal information service (ATIS) message. The method may further comprise converting the broadcasted message to a converted digital message when the broadcasted message comprises a broadcasted voice message. Parsing the broadcasted message may comprise parsing a converted digital message into a plurality of message components when a broadcasted voice message is captured. Parsing the broadcasted message may comprise parsing a broadcasted digital message into a plurality of message components when a broadcasted digital message is captured. The plurality of subcategories may include at least some of weather information, runway information, taxi information, navigation information, approach information, and radio frequency information. A first subset of the plurality of context-based graphical elements may be actuatable to cause an event related to the subcategorized message feature to be performed, and a second subset of the plurality of context-based graphical elements may be configured to display event performance results. The method may further comprise: receiving an event performance request via the actuation of a context-based graphical element from the first subset of context-based graphical elements; and causing the performance of an event responsive to the event performance request. The method may further comprise displaying results from the performance of the event via a context-based graphical element from the second subset of context-based graphical elements when the performed event calls for the display of results via the GUI.

In another embodiment, a system for presenting broadcasted aeronautical information in an aircraft is provided.

The system comprises one or more processors configured by programming instructions on non-transient computer readable media. The system is configured to: capture a broadcasted aeronautical information message; parse the broadcasted message into a plurality of message components; extract a plurality of message features from the plurality of message components; categorize each message feature based on a flight phase to which the message feature pertains; group each categorized message feature into a predetermined one of a plurality of avionic subcategories; associate each subcategorized message feature with one of a plurality of context-based graphical elements, wherein each context-based graphical element is configured to display textual information descriptive of the message feature and/or graphical information descriptive of the message feature; and cause the display of descriptive information regarding a first category of the subcategorized message features via their associated context-based graphical element in a graphical user interface (GUI) display.

These aspects and other embodiments may include one or more of the following features. The broadcasted aeronautical information message may comprise a broadcasted voice message or a broadcasted digital message. The broadcasted aeronautical information message may comprise an automatic terminal information service (ATIS) message. The system may be further configured to convert the broadcasted message to a converted digital message when the broadcasted message comprises a broadcasted voice message. To parse the broadcasted message, the system may be configured to parse a converted digital message into a plurality of message components when a broadcasted voice message is captured. To parse the broadcasted message, the system may be configured to parse a broadcasted digital message into a plurality of message components when a broadcasted digital message is captured. The plurality of subcategories may include at least some of weather information, runway information, taxi information, navigation information, approach information, and radio frequency information. A first subset of the plurality of context-based graphical elements may be actuatable to cause an event related to the subcategorized message feature to be performed, and a second subset of the plurality of context-based graphical elements may be configured to display event performance results. The system may be further configured to: receive an event performance request via the actuation of a context-based graphical element from the first subset of context-based graphical elements; and cause the performance of an event responsive to the event performance request. The system may be further configured to display results from the performance of the event via a context-based graphical element from the second subset of context-based graphical elements when the performed event calls for the display of results via the GUI.

In another embodiment, non-transient computer readable media encoded with programming instructions configurable to perform a method is provided. The method comprises: capturing a broadcasted aeronautical information message; parsing the broadcasted message into a plurality of message components; extracting a plurality of message features from the plurality of message components; categorizing each message feature based on a flight phase to which the message feature pertains; grouping each categorized message feature into a predetermined one of a plurality of avionic subcategories; associating each subcategorized message feature with one of a plurality of context-based graphical elements, wherein each context-based graphical element is configured to display textual information descriptive of the message feature and/or graphical information descriptive of the message feature; and causing the display of descriptive information regarding a first category of the subcategorized message features via their associated context-based graphical element in a graphical user interface (GUI) display.

These aspects and other embodiments may include one or more of the following features. The broadcasted aeronautical information message may comprise a broadcasted voice message or a broadcasted digital message. The broadcasted aeronautical information message may comprise an automatic terminal information service (ATIS) message. The method may further comprise converting the broadcasted message to a converted digital message when the broadcasted message comprises a broadcasted voice message. Parsing the broadcasted message may comprise parsing a converted digital message into a plurality of message components when a broadcasted voice message is captured. Parsing the broadcasted message may comprise parsing a broadcasted digital message into a plurality of message components when a broadcasted digital message is captured. The plurality of subcategories may include at least some of weather information, runway information, taxi information, navigation information, approach information, and radio frequency information. A first subset of the plurality of context-based graphical elements may be actuatable to cause an event related to the subcategorized message feature to be performed, and a second subset of the plurality of context-based graphical elements may be configured to display event performance results. The method may further comprise: receiving an event performance request via the actuation of a context-based graphical element from the first subset of context-based graphical elements; and causing the performance of an event responsive to the event performance request. The method may further comprise displaying results from the performance of the event via a context-based graphical element from the second subset of context-based graphical elements when the performed event calls for the display of results via the GUI.

In another embodiment, a processor-implemented method for presenting broadcasted aeronautical information in an aircraft is provided. The method comprises: capturing the broadcasted aeronautical information as a broadcasted voice message or a broadcasted digital message, wherein the broadcasted message comprises an automatic terminal information service (ATIS) message; converting the broadcasted message to a converted digital message when the broadcasted message comprises a broadcasted voice message; parsing the broadcasted digital message into a plurality of message components when a broadcasted digital message is captured and parsing the converted digital message into a plurality of message components when a broadcasted voice message is captured; extracting a plurality of message features from the plurality of message components; categorizing each message feature based on a flight phase to which the message feature pertains; grouping each categorized message feature into a predetermined one of a plurality of avionic subcategories, the plurality of subcategories including at least some of weather information, runway information, taxi information, navigation information, approach information, and radio frequency information; associating each subcategorized message feature with one of a plurality of context-based graphical elements, each context-based graphical element configured to display textual information descriptive of the message feature and graphical information descriptive of the message feature, a first subset of the plurality of context-based graphical elements actuatable to cause an event related to the subcategorized message feature to be performed, and a second subset of the plurality of context-based graphical elements configured to display event performance results; causing the display of descriptive information regarding a first category of the subcategorized message features via their associated context-based graphical element in a graphical user interface (GUI) display; receiving an event performance request via the actuation of a context-based graphical element from the first subset of context-based graphical elements; causing the performance of an event responsive to the event performance request; and displaying results from the performance of the event via a context-based graphical element from the second subset of context-based graphical elements when the performed event calls for the display of results via the GUI.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention if such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A processor-implemented method for presenting broadcasted aeronautical information in an aircraft, the method comprising:
    capturing a broadcasted aeronautical information message;
    parsing the broadcasted message into a plurality of message components;
    extracting a plurality of message features from the plurality of message components;
    categorizing each message feature based on a flight phase to which the message feature pertains;
    grouping each categorized message feature into a predetermined one of a plurality of avionic subcategories comprising weather information, runway information, taxi information, navigation information, approach information, and radio frequency information;
    providing a plurality of context-based graphical elements comprising:
        a first subset that is actuatable to request that an event from a plurality of events be performed wherein each event is related to a subcategorized message feature, a second subset that is configured to display performance results from one event out of the plurality of events wherein the one event is performed responsive to the actuation of a context-based graphical element from the first subset; and a third subset that is configured to display textual information descriptive of a message feature and/or graphical information descriptive of the message feature;

associating each subcategorized message feature with one of the plurality of context-based graphical elements;

causing the display of descriptive information regarding a first category of the subcategorized message features via a second-context-based graphical element from the first subset or the third subset in a graphical user interface (GUI) display;

causing a value displayed by the second context-based graphical element to be inserted into an appropriate flight deck equipment responsive to the selection of the second context-based graphical element when the second context-based graphical element is from the first subset; and causing the value displayed by the second context-based graphical element to be inserted into an appropriate flight deck equipment responsive to the selection of a first context-based graphical element from the first subset when the second context-based graphical element is from the third subset.

2. The method of claim 1, wherein the second context-based graphical element provides a textual indication of approach type and star (standard terminal arrival route) retrieved from the broadcasted aeronautical information message and the first context-based graphical element when selected causes the insertion of the approach type and STAR into appropriate flight deck equipment.

3. The method of claim 1, wherein the broadcasted aeronautical information message comprises an automatic terminal information service (ATIS) message.

4. The method of claim 1, wherein the second context-based graphical element provides a textual indication of QNH retrieved from the broadcasted aeronautical information message, and the first context-based graphical element when selected causes the insertion of the QNH into appropriate flight deck equipment.

5. The method of claim 1, wherein the first context-based graphical element and the second context-based graphical element are highlighted to indicate a change in value indicated by the second context-based graphical element from a previously indicated value.

6. The method of claim 1, wherein the second context-based graphical element provides a graphical indication of temperature, and the first context-based graphical element identifies the temperature value retrieved from the broadcasted aeronautical information message and when selected causes the insertion of the temperature into appropriate flight deck equipment.

7. The method of claim 1, wherein the second context-based graphical element provides a textual display of takeoff runway options from the broadcasted aeronautical information message, and further comprising:

a third context-based graphical element from the first subset of the plurality of context-based graphical elements that when selected causes the calculation of runway length; and a fourth context-based graphical element from the second subset of the plurality of context-based graphical elements that displays whether the runway length for the takeoff runway options identified by the second context-based graphical element is suitable for the aircraft.

8. The method of claim 1, wherein the second context-based graphical element provides a textual indication of the visibility value retrieved from the broadcasted aeronautical information message, and further comprising a third context-based graphical element that indicates that the textual value identified by the second context-based graphical element relates to visibility.

9. The method of claim 1, wherein the second context-based graphical element provides a textual indication of wind speed and direction retrieved from the broadcasted aeronautical information message, and further comprising a third context-based graphical element indicates that the textual value identified by the second context-based graphical element relates to wind speed and direction.

10. The method of claim 1, wherein the second context-based graphical element provides a textual indication of the airport retrieved from the broadcasted aeronautical information message, and the first context-based graphical element indicates the radio frequency for the ground and when selected causes the insertion of the ground frequency into appropriate flight deck equipment; and further comprising a third context-based graphical element that indicates the radio frequency for the tower and when selected causes the insertion of the tower frequency into appropriate flight deck equipment, and a fourth context-based graphical element that indicates the radio frequency for approach and when selected causes the insertion of the approach frequency into appropriate flight deck equipment.

11. A system for presenting broadcasted aeronautical information in an aircraft, the system comprising one or more processors configured by programming instructions on non-transient computer readable media, the system configured to:

capture a broadcasted aeronautical information message;

parse the broadcasted message into a plurality of message components;

extract a plurality of message features from the plurality of message components;

categorize each message feature based on a flight phase to which the message feature pertains;

group each categorized message feature into a predetermined one of a plurality of avionic subcategories comprising weather information, runway information, taxi information, navigation information, approach information, and radio frequency information;

provide a plurality of context-based graphical elements comprising:

a first subset that is actuatable to request that an event from a plurality of events be performed wherein each event is related to a subcategorized message feature, a second subset that is configured to display performance results from one event out of the plurality of events wherein the one event is performed responsive to the actuation of a context-based graphical element from the first subset; and a third subset that is configured to display textual information descriptive of a message feature and/or graphical information descriptive of the message feature;

associate each subcategorized message feature with one of the plurality of context-based graphical elements;

cause the display of descriptive information regarding a first category of the subcategorized message features via a second context-based graphical element from the first subset or the third subset in a graphical user interface (GUI) display;

cause a value displayed by the second context-based graphical element to be inserted into an appropriate flight deck equipment responsive to the selection of the second context-based graphical element when the second context-based graphical element is from the first subset; and cause the value displayed by the second context-based graphical element to be inserted into an appropriate flight deck equipment responsive to the selection of a first context-based graphical element from the first subset when the second context-based graphical element is from the third subset.

12. The system of claim 11, wherein the second context-based graphical element provides a textual indication of approach type and star (standard terminal arrival route) retrieved from the broadcasted aeronautical information message and the first context-based graphical element when selected causes the insertion of the approach type and STAR into appropriate flight deck equipment.

13. The system of claim 11, wherein the second context-based graphical element provides a textual indication of QNH retrieved from the broadcasted aeronautical information message, and the first context-based graphical element when selected causes the insertion of the QNH into appropriate flight deck equipment.

14. The system of claim 11, wherein the second context-based graphical element provides a textual indication of the airport retrieved from the broadcasted aeronautical information message, and the first context-based graphical element indicates the radio frequency for the ground and when selected causes the insertion of the ground frequency into appropriate flight deck equipment; and further configured to cause the insertion of a tower frequency into appropriate flight deck equipment responsive to selection of a third context-based graphical element that indicates a radio frequency for a tower, and cause the insertion of an approach frequency into appropriate flight deck equipment responsive to selection of a fourth context-based graphical element that indicates a radio frequency for approach.

15. The system of claim 11, wherein the second context-based graphical element provides a graphical indication of temperature, and the first context-based graphical element identifies the temperature value retrieved from the broadcasted aeronautical information message and when selected causes the insertion of the temperature into appropriate flight deck equipment.

16. The system of claim 11, wherein the second context-based graphical element provides a textual display of takeoff runway options from the broadcasted aeronautical information message, and further configured to:

cause the calculation of runway length responsive to selection of a third context-based graphical element from the first subset of the plurality of context-based graphical elements; and provide a fourth context-based graphical element from the second subset of the plurality of context-based graphical elements that displays whether the runway length for the takeoff runway options identified by the second context-based graphical element is suitable for the aircraft.

17. The system of claim 11, wherein the second context-based graphical element provides a textual indication of a visibility value retrieved from the broadcasted aeronautical information message, and further configured to provide a third context-based graphical element that indicates that the textual value identified by the second context-based graphical element relates to visibility.

18. The system of claim 11, wherein the second context-based graphical element provides a textual indication of wind speed and direction retrieved from the broadcasted aeronautical information message, and further configured to provide a third context-based graphical element that indicates that the textual value identified by the second context-based graphical element relates to wind speed and direction.

19. The system of claim 11, further configured to group a categorized message feature into each of the weather information, runway information, taxi information, navigation information, approach information, and radio frequency information avionic subcategories.

20. Non-transient computer readable media encoded with programming instructions configurable to perform a method, the method comprising:

capturing a broadcasted aeronautical information message;

parsing the broadcasted message into a plurality of message components;

extracting a plurality of message features from the plurality of message components;

categorizing each message feature based on a flight phase to which the message feature pertains;

grouping each categorized message feature into a predetermined one of a plurality of avionic subcategories comprising weather information, runway information, taxi information, navigation information, approach information, and radio frequency information;

providing a plurality of context-based graphical elements comprising:

a first subset that is actuatable to request that an event from a plurality of events be performed wherein each event is related to a subcategorized message feature, a second subset that is configured to display performance results from one event out of the plurality of events wherein the one event is performed responsive to the actuation of a context-based graphical element from the first subset; and a third subset that is configured to display textual information descriptive of a message feature and/or graphical information descriptive of the message feature;

associating each subcategorized message feature with one of the plurality of context-based graphical elements;

causing the display of descriptive information regarding a first category of the subcategorized message features via a second-context-based graphical element from the first subset or the third subset in a graphical user interface (GUI) display;

causing a value displayed by the second context-based graphical element to be inserted into an appropriate flight deck equipment responsive to the selection of the second context-based graphical element when the second context-based graphical element is from the first subset; and causing the value displayed by the second context-based graphical element to be inserted into an appropriate flight deck equipment responsive to the selection of a first context-based graphical element from the first subset when the second context-based graphical element is from the third subset.

* * * * *